United States Patent
Dolby et al.

(10) Patent No.: US 11,663,110 B2
(45) Date of Patent: May 30, 2023

(54) ANALYSIS TO CHECK WEB API CODE USAGE AND SPECIFICATION

(71) Applicant: INTERNATIONAL BUSINESS MACHINES CORPORATION, Armonk, NY (US)

(72) Inventors: Julian T. Dolby, Bronx, NY (US); Jim A. Laredo, Katonah, NY (US); John E. Wittern, New York, NY (US); Annie T. T. Ying, White Plains, NY (US); Yunhui Zheng, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 15/339,792

(22) Filed: Oct. 31, 2016

(65) Prior Publication Data
US 2018/0121320 A1    May 3, 2018

(51) Int. Cl.
*G06F 11/36* (2006.01)
*G06F 11/00* (2006.01)

(52) U.S. Cl.
CPC ......... *G06F 11/3608* (2013.01); *G06F 11/00* (2013.01); *G06F 11/3604* (2013.01)

(58) Field of Classification Search
CPC ....... G06F 8/00–78; G06F 11/36–3696; G06F 8/41–437; G06F 11/00; G06F 11/3604; G06F 11/3608
See application file for complete search history.

(56) References Cited

U.S. PATENT DOCUMENTS

| | | | | |
|---|---|---|---|---|
| 6,138,157 | A * | 10/2000 | Welter | G06F 11/3688 709/224 |
| 8,015,543 | B1 * | 9/2011 | Carrick | G06F 8/35 717/106 |
| 8,473,899 | B2 | 6/2013 | Centonze et al. | |
| 8,904,353 | B1 * | 12/2014 | Arguelles | G06F 11/3672 717/124 |
| 8,949,812 | B2 | 2/2015 | Joukov et al. | |

(Continued)

OTHER PUBLICATIONS

Klammer, Claus, and Albin Kern. "Writing unit tests: It's now or never!." 2015 IEEE Eighth International Conference on Software Testing, Verification and Validation Workshops (ICSTW). IEEE, 2015. (Year: 2015).*

(Continued)

*Primary Examiner* — S. Sough
*Assistant Examiner* — Joanne G Macasiano
(74) *Attorney, Agent, or Firm* — Intelletek Law Group, PLLC; Gabriel Daniel, Esq.

(57) ABSTRACT

A debugging tool and method for statically verifying programs that invoke web-based services through API calls is provided. The tool receives source code that comprises one or more invocation of web APIs for requesting web-based services. The tool also receives a set of web API specifications. The tool extracts a set of request information for each web API invocation in the source code, the set of request information including a usage string of an URL endpoint. The tool verifies whether the set of request information complies with the received web API specifications and reports a result of the verification.

18 Claims, 12 Drawing Sheets

(56) References Cited

U.S. PATENT DOCUMENTS

| | | | | |
|---|---|---|---|---|
| 2002/0062463 | A1* | 5/2002 | Hines | G06F 8/36 |
| | | | | 714/38.14 |
| 2005/0081192 | A1* | 4/2005 | DeLine | G06F 11/3604 |
| | | | | 717/126 |
| 2008/0228466 | A1* | 9/2008 | Sudhakar | G06F 11/3692 |
| | | | | 704/9 |
| 2009/0300266 | A1* | 12/2009 | Pistoia | G06F 8/433 |
| | | | | 711/100 |
| 2011/0088023 | A1* | 4/2011 | Haviv | G06F 21/6218 |
| | | | | 717/155 |
| 2011/0154300 | A1* | 6/2011 | Rao | G06F 11/3624 |
| | | | | 717/133 |
| 2011/0264961 | A1* | 10/2011 | Hong | H04L 43/50 |
| | | | | 714/38.1 |
| 2011/0321010 | A1 | 12/2011 | Wang | |
| 2014/0258992 | A1* | 9/2014 | Guarnieri | G06F 21/564 |
| | | | | 717/131 |
| 2015/0007146 | A1* | 1/2015 | Li | G06F 11/3684 |
| | | | | 717/130 |
| 2016/0373462 | A1* | 12/2016 | Wang | H04L 65/4069 |
| 2017/0331850 | A1* | 11/2017 | Li | H04L 63/1433 |
| 2019/0079738 | A1* | 3/2019 | Samuel | G06F 9/44589 |

OTHER PUBLICATIONS

Halfond, William GJ, and Alessandro Orso. "Combining static analysis and runtime monitoring to counter SQL-injection attacks." Proceedings of the third international workshop on Dynamic analysis. 2005. (Year: 2005).*

Anonymous, "A System Test Coverage Analysis Method for SOA Application," IP.com Prior Art Database Technical Disclosure, IPCOM000212362D, Nov. 8, 2011.

Anonymous, "Automatic Generation of Translation Test Data Using Source Repository Analysis," IP.com Prior Art Database Technical Disclosure, IPCOM000232463D, Nov. 11, 2013.

Williams, et al., "Automatic Mining of Source Code Repositories to Improve Bug Finding Techniques," IEEE Transactions on Software Engineering, vol. 31, No. 6, AN-8525304, Jun. 2005.

* cited by examiner

ANALYSIS TO CHECK WEB API CODE USAGE AND SPECIFICATION

BACKGROUND

Technical Field

The present disclosure generally relates to development-time verification of source code.

Description of the Related Art

Programmers write applications using a growing variety of publicly accessible web services. Applications can access and/or request these publicly accessible web services by invoking their corresponding web Application Programming Interfaces (web APIs).

SUMMARY

Some embodiments of the disclosure provide a debugging tool for statically verifying programs that invoke web-based services through API calls. The tool receives source code that comprises one or more invocations of web APIs for requesting web-based services. The tool also receives a set of web API specifications. The tool extracts a set of request information for each web API invocation in the source code, the set of request information including a usage string of an URL endpoint. The tool verifies whether the set of request information complies with the received web API specifications and reports a result of the verification.

Some embodiments of the disclosure provide a debugging tool for statically verifying a program that generates usage strings for accessing external services. The tool identifies an invocation statement in the source code for using a service that is provided by an entity outside of the source code. The tool identifies data flow of string variables in the source code that lead to the identified invocation statement. The tool assembles one or more usage strings that can be formed at the invocation statement based on the identified data flow of string variables. The tool checks each assembled string based on a specification for describing permissible strings.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is provided. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
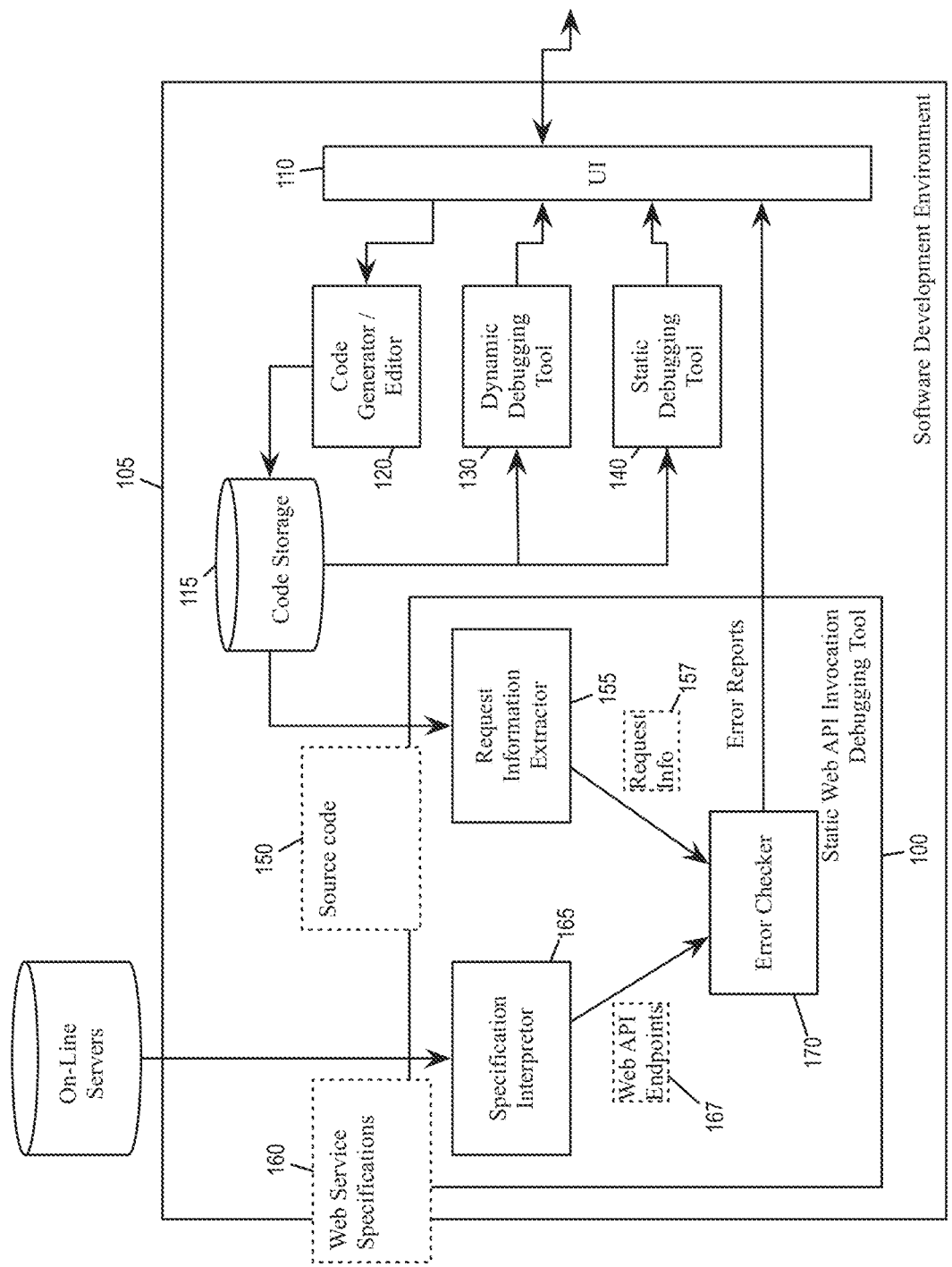
FIG. 1 illustrates a static web API invocation debugging tool for identifying web service invocation errors.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Programmers write applications using a growing variety of publicly accessible web services. Applications can access and/or request these publicly accessible web services by invoking their corresponding web Application Programming Interfaces (web APIs). Specifications of the web APIs can be found in various on-line documentations that expose the publicly accessible web services. Such specifications (such as the OpenAPI Specification, also known as Swagger) document valid uniform resource locators (URLs), hypertext transfer protocol (HTTP) methods, as well as inputs and outputs that a web API expects.

To access a web service by invoking a web API, the application sends HTTP requests to a dedicated URLs using one of its supported HTTP methods. Required data is sent as query or path parameters, or within the HTTP request body. Web APIs are programmatic interfaces that applications invoke via an HTTP to interact with remote resources, such as data or functionalities. Resources are identified by URLs while the type of interaction (e.g., retrieval, update, deletion of a resource) depends on the HTTP method (such as "GET", "PUT"). For some embodiments, the combination of a URL and HTTP method are referred to as an endpoint of a web API. In order to be successfully invoked, some web API endpoints depend on additional data, such as the ID of a resource being sent as a path parameter within the URL or a new/updated state of a resource being sent in the body of an HTTP request. The URL, the HTTP method, and data to send are all strings constructed by string operations (such as concatenation) within applications that invoke the web API endpoint.

When an HTTP request targets a URL that does not exist or sends data that does not comply with the requirements of the web API, a runtime error occurs. Unfortunately, since the web API calling mechanism relies entirely on strings rather than data with specific types, type-safety checking is not available. In other words, programmers writing codes that use web APIs cannot use traditional compile-time error checks and often have to rely on dynamic run-time errors to troubleshoot. This situation is exacerbated by the fact that web applications are increasingly developed using dynamic languages like JavaScript, which generally have minimal static checking before run-time.

Some embodiments of the disclosure provide a debugging tool for analyzing source code (e.g., JavaScript), specifically to statically troubleshoot invocations of web APIs in the source code. The tool identifies HTTP requests and retrieves the related URL, HTTP method, and request data from the source code. The debugging tool performs inter-procedural analysis in order to track the assembling of strings across functions in the source code. The strings that are assembled at an invocation statement in the source code for accessing and using a web API are referred to as a usage string. To verify the assembled usage strings, the tool retrieves web API specifications for definitions of valid URLs, HTTP methods, and data. The debugging tool detects possible erroneous web API usage strings and reports errors as the programmer is writing the application, or during continuous integration. In some embodiments, the tool also enables API providers to monitor usages of their APIs in publicly available codes.

FIG. 1 illustrates a static web API invocation debugging tool 100 for identifying web service invocation errors. The static web API invocation debugging tool 100 statically analyzes source code (such as JavaScript) before run-time for errors related to generation of web service requests (i.e., invocation of web APIs). The debugging tool 100 is part of a software development environment 105 operating at a computing device. The software development environment includes the static web API invocation debugging tool 100, a user interface 110, source code storage 115, a code generator/editor 120, a dynamic debugging tool 130, and a static debugging tool 140.

The code generator/editor 120 generates source code or receives programmer input from the user interface 110 for editing source code. In some embodiments, an integrated development environment (IDE) provides the source code. In some embodiments, a mining public repository such as GitHub, BitBucket, SourceForge provides the source code. The code storage 115 stores the generated or edited source code as source code files.

The dynamic debugging tool 130 allows the user to check for run-time errors in the source code by executing the source code as programs and observing output of the executed program. The static debugging tool 140 allows the user to check for errors in the source code before run-time based on type-safety checking. Unlike the dynamic debugging tool 130, the static web API invocation debugging tool 100 is a static debugging tool that does not require execution of the source code. Unlike the static debugging tool 140, the static web API invocation debugging tool 100 checks invocation of web APIs by comparing character strings without type-safety checking.

As illustrated, the static web API invocation debugging tool 100 receives source code files 150 from the code storage 115 and performs static debugging of web API invocations in the source code by referencing web API specifications 160. The web API specifications 160 are documentations that expose the publicly accessible web services as APIs. Such specifications document valid URLs, HTTP methods, as well as inputs and outputs that a web API expects. The software development environment may obtain the specification 160 from over the Internet, from a cloud-based storage medium, or from a local storage medium. The software development environment (or the computing device running the software development environment) may also provide some of the web API specifications 160.

Source code that accesses and/or request web-based services has invocation statements for invoking web APIs (or referred to as web API invocations). For each web API invocation, the source code generates a set of data for requesting and using the web service. These data are referred to as the web service request information (or referred to as request information) of the web API invocation. The static web API invocation debugging tool 100 has an extractor 155 for extracting a set of request information 157 for each web API invocation in the source code 150. A set of request information for a web API invocation may include a URL, an HTTP method, and request data. The static web API invocation debugging tool 100 also has a specification interpreter 165, which identifies web API endpoints 167 in the web API specifications 160. The interpreter 165 interprets the web API specification 160 according to its format, which can be OpenAPI (Swagger), RESTful API modeling language (RAML), or API Blueprint. An example of a web API specification in OpenAPI format is described below by reference to FIG. 3 below. The static web API invocation debugging tool 100 have an error checker 170 that uses the identified web API endpoint 167 and the extracted request information 157 to determine if the web API invocations in the source code 150 have statically detectable errors.

Figure 2:
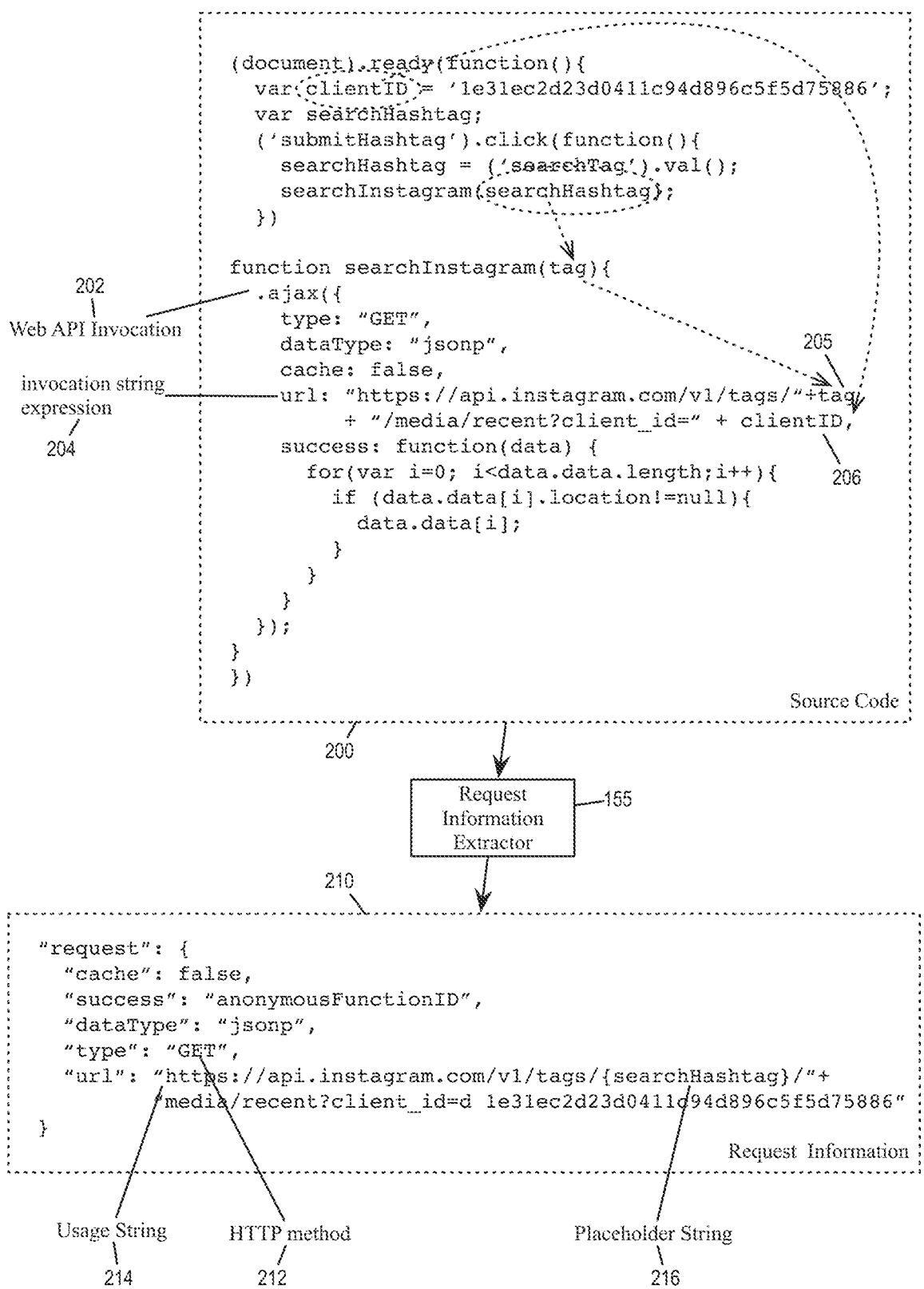
FIG. 2 illustrates the extraction of web service request information from source code.

FIG. 2 illustrates the extraction of web service request information from source code. The figure illustrates the extractor 155 extracting from a source JavaScript code 200 a set of request information 210 for a web API invocation statement 202. The extractor 155 does so by performing inter-procedural static analysis to identify data flow and/or the define-use structure of the source code 200 and to assemble usage strings for the web API invocation 202 based the identified data flow and/or the define-use structure.

The extractor 155 scans through the source code 200 to identify web API invocations. For each web API invocation that the extractor identifies, the extractor produces a set of request information for the identified web API invocation. In the example of FIG. 2, the extractor 155 identifies the command "$.ajax" in the function "searchInstagram" as a web API invocation statement 202 in the source code 200. The extractor then proceeds to extract request information regarding this invocation. The extracted request information 210 includes an HTTP method 212 ("GET") and a usage string 214. The extractor produces the usage string 214 by examining the identified web API invocation statement 202. The extractor follows the invocation statement 202 to identify an invocation string expression 204 that is associated with the invocation statement. The invocation string expression 204 states that "https://api.instagram.com/v1/tags/"+tag+"/media/recent?client_id="+clientID.

The invocation string expression 204 includes both constant values (substrings within double quotation marks) and variable values (substrings outside of quotation marks), including string variable 205 "tag" and string variable "clientID" 206. The extractor 155 then assembles the usage string 214 by attempting to resolve each of the variable values by following the flow of variables in the source code 200. For each string variable that can be resolved statically into a literal string value, the extractor replaces the string variable with the resolved literal string value when assembling the usage string 214. For each string variable that cannot be resolved statically into a literal value, the extractor inserts a placeholder string variable with a symbolic value when assembling the usage string 214.

For the string variable 206 "clientID", the extractor determines that it comes from a variable definition that assigns the variable "clientID" with the literal string value "1e31e . . . 75886". The extractor 155 is therefore able to statically resolve the value of the string variable "clientID" when assembling the request usage string 214. For the string variable 205 "tag", the extractor determines that it comes from the argument of the function "searchInstagram", and that the function "searchInstagram" is invoked with string variable "searchHashtag". However, the source code never assigns the variable "searchHashtag" to a literal string value so that the string variable "tag" cannot be resolved statically. The extractor 155 therefore inserts placeholder string 216 in place of the string variable "tag" when assembling the request usage string 214. The extractor 155 here creates the placeholder string 216 with symbolic value by putting wiggly brackets around a symbol representing the unresolved variable (i.e., {searchHashtag}).

Figure 3:
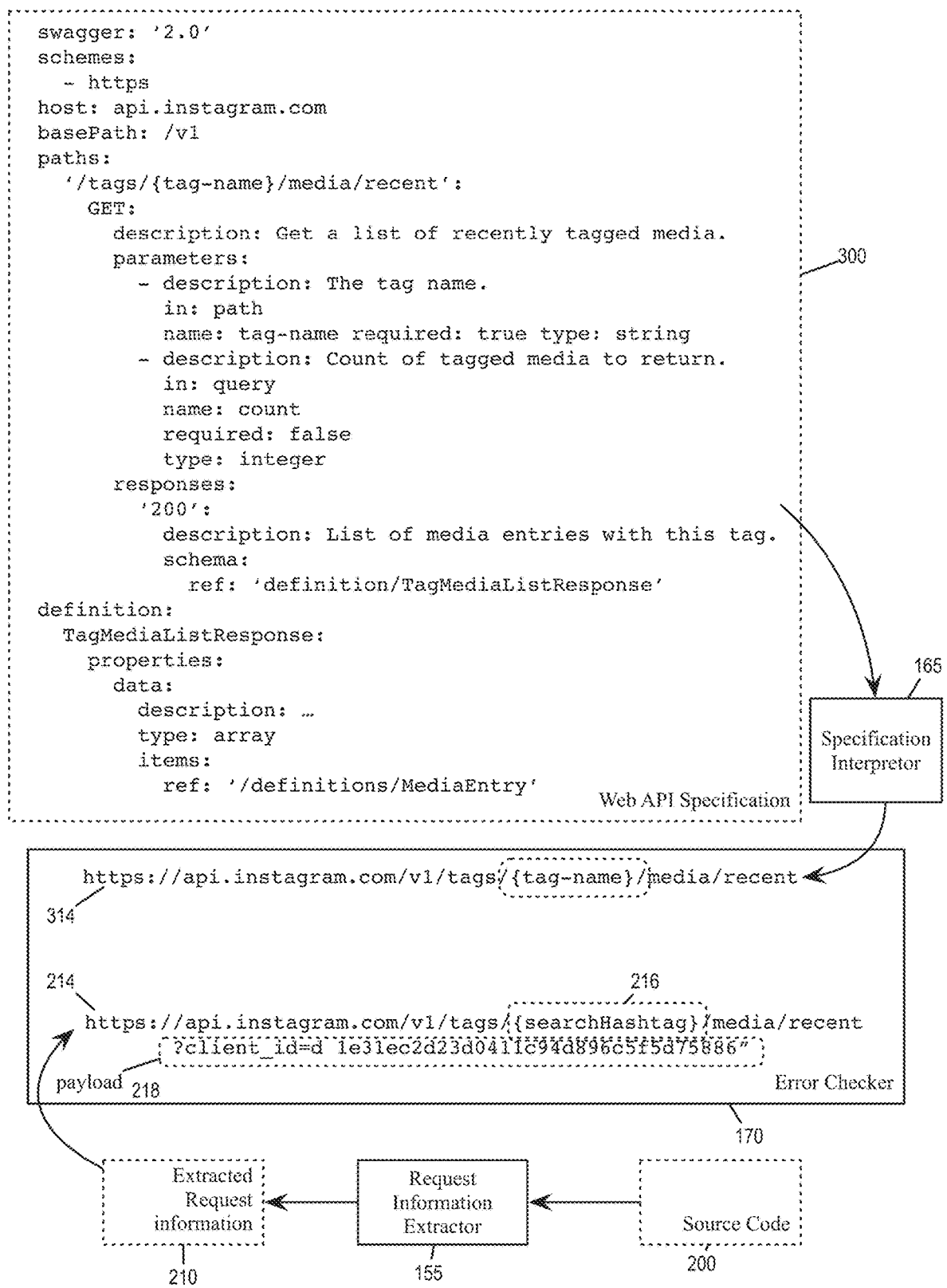
FIG. 3 shows the comparison of the extracted request information with a web API specification.

The static web API invocation debugging tool 100 in turn checks whether the extracted information from the web API invocation conforms to the received web API specifications. The check determines whether the assembled usage string, together with the associated HTTP method, targets an actual web API endpoint defined in the web API specification. The debugging tool 100 checks whether the assembled usage string 214 comply with the specification by treating the placeholder string variables as wildcards. The debugging tool also checks whether the request data of the usage string 214 complies with the requirement of the specification. FIG. 3 illustrates the checking of the request information against a web API specification.

FIG. 3 shows the comparison of the extracted request information 210 with a web API specification 300. As illustrated, the web API specification 300 is in Swagger 2.0 format. The specification 300 describes an API for accessing Instagram® web services. It defines, the schemes of the API, its host and base path, which together form the API's base URL (in this case "https://api.instagram.com/v1"). Swagger defines the different endpoints of an API in the paths property, using URL templates (possibly including path parameters, i.e., {tag-name} in the path/tags/{tag-name}/media/recent) and supported HTTP methods. Per API endpoint, Swagger provides a human-readable description, definitions of the parameters (path and query parameters as well as required HTTP bodies), definitions of possible responses, as well as security requirements. Entries in the definitions property describe the structure of data to send to or receive from API endpoints using JSON schema notation or a XML Object notation that is specific to Swagger. Data definitions can be referenced from API endpoint definitions, as is exemplary shown for a "TagMediaListResponse" definition.

The static web API invocation debugging tool 100 checks whether the extracted information 210 from the web API invocation 202 conforms with the web API specification 300. The check starts by determining whether the usage string 214 extracted by the extractor 155 targets an actual API endpoint defined in the Swagger specification 300 of the Instagram API, including the placeholder string 216 {searchHashtag}. The debugging tool also checks whether the string variable 206 "ClientID" is expected by the endpoint or if there are other query parameters required but missing in the usage string 214. The debugging tool 100 also checks whether data sent in the request body (i.e., the request data 218 in the usage string 214) complies with the data definitions in the Swagger specification.

As illustrated, the debugging tool (using the specification interpreter 165) constructs an endpoint specification string 314 based on the web API specification 300 for the purpose of comparison with the usage string 214. The error check 170 compares this endpoint specification string 314 with the usage string 214 to see whether the usage string 214 complies with the endpoint specification string 314. In this example, the usage string 214 includes the same endpoint path as the endpoint specification string 314, i.e., "http://api.instagram.com/v1/tags{tag-name}/media/recent". This is a valid match even though the usage string has a placeholder string variable 216 {searchHashtag}. The placeholder string variable 216 allows the check of the web service request to proceed even though part of the usage is unknown before run-time. The usage string 214 also differs with the endpoint specification string 314 in that the usage string also includes additional request data 218 (including a "client_id" parameter). The debugging tool checks the additional request data 218 against the definition or requirement for "parameters" and "responses" in the web API specification 300.

In some embodiments, the static web API invocation debugging tool may extract multiple possible usage strings for one web API invocation. This can occur if a string variable in the source code has multiple definitions from multiple different data flows and/or define-use chains. The static web API invocation debugging tool considers all possible data flows that contribute to a web API invocation when assembling usage strings for the web API invocation.

Figure 4:
FIG. 4 illustrates a web API invocation that have multiple usage strings during static analysis.

FIG. 4 illustrates a web API invocation that has multiple usage strings during static analysis. The figure illustrates the extraction of usage strings from an example source code 401. The static web API invocation debugging tool extracts request information 420 for a web API invocation statement 411 in the source code 401. The web API invocation statement 411 has an invocation string expression 412 "http://api.spotify.com/v1/tracks/"+trackID. This expression has a string variable "trackID that depends on the value passed into the function "changeDisplayStuffs". According to the source code 401, the function "changeDisplayStuffs" is called twice, once with string value "1Hbcc1 . . . GCKdS", once with value "79q1Nz . . . 0zdtz". The debugging tool therefore assembles two usage strings 421 and 422 for the request information 420 of the web API invocation 411. The debugging tool would check both of these usage strings against the web API specification for the static check.

Figure 5:
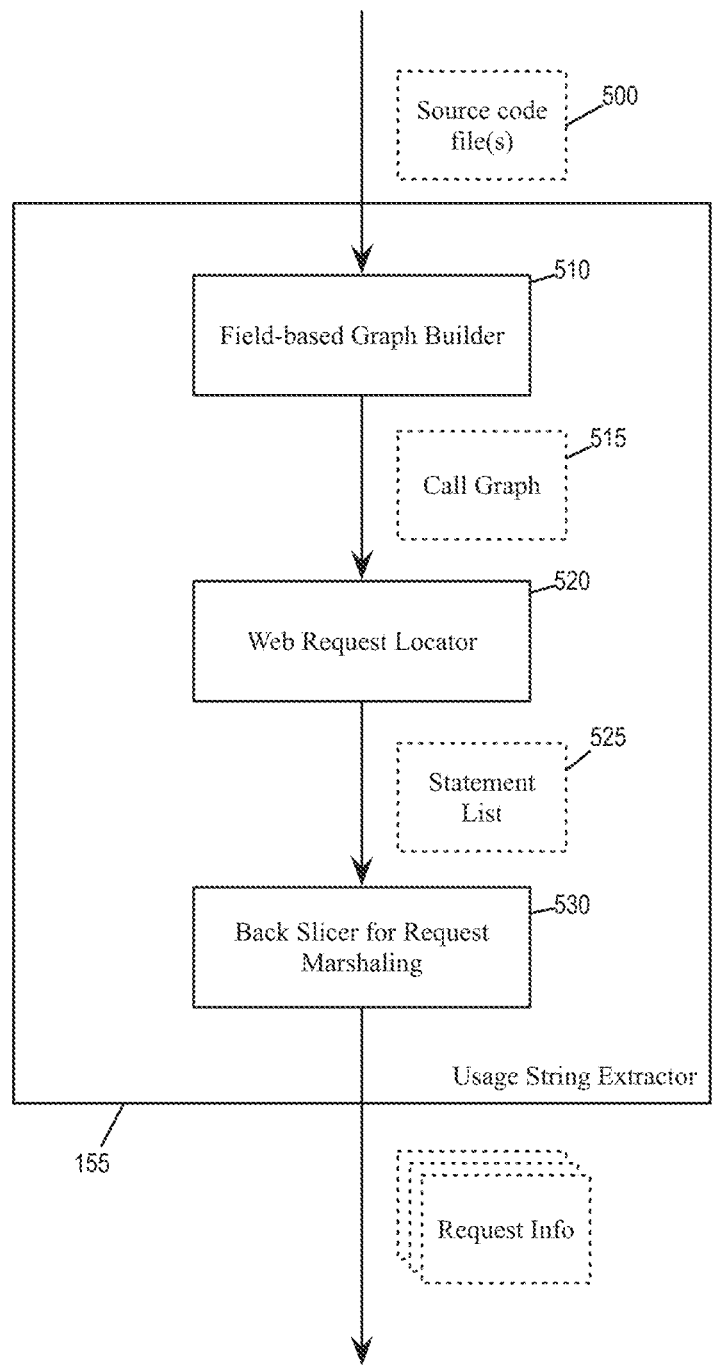
FIG. 5 illustrates a pipeline for identifying web API invocations in source code and for extracting the request information for the identified web API invocations.

As mentioned, the static web API invocation debugging tool performs inter-procedural analysis in order to track strings that are assembled across functions. FIG. 5 illustrates a pipeline for identifying web API invocations in source code and for extracting the request information for the identified web API invocations. The pipeline assembles usage strings by tracking the flows of variable assignment across procedures and/or functions in the source code. For the static web API invocation debugging tool 100, the pipeline stages are part of the extractor 155. As illustrated, the extractor 155 includes three pipeline stages: a field graph builder 510, a web request locator 520, and a backward slicer 530.

The extractor 155 receives source code from a set of source code files 500 (e.g., JavaScript files) as input. The graph builder 510 parses and translates the source code into an intermediate representation and builds an approximate call graph 515. In some embodiments, the call graph is a field-based call graph that uses one abstraction for all instances of each property used in the program, rather than using one abstraction for each property of each abstract object as in a conventional call graphs. Experimental results show that using field-based call graphs scale well for framework-based JavaScript web applications even in the presence of JavaScript's dynamic features. For some embodiments, the debugging tool uses a publicly available field-based call graph constructor to implement the call graph builder stage 510. For the entry points of the call graph, the graph builder 510 takes all functions in the source code as entry points (rather than taking only event handlers and top-level blocks as entry points).

The web request locator 520 identifies web API invocation statements in the call graph 515 by looking for framework-specific patterns in the call graph (i.e., patterns specific to a JavaScript Library). For a JavaScript library such as jQuery, the web request locator 520 handles common patterns such as function calls to $.ajax, $.get, and $.post. The web request locator 520 identifies instructions that make such calls and uses them as the seeds for an inter-procedural data flow analysis for the next component in the pipeline (i.e., the backward slicer 530). When source code does not include a web API invocation statement that matches one of the framework specific patterns, the web request locator 520 does not produce any output and the pipeline terminates. Once identified, the web request locator 520 produces a statement list 525 that lists the identified web API invocation statements.

The back slicer 530 extracts the statements in the source code that contribute to the input of the web API invocations. Starting from each web API invocation statement listed in the statement list 525, the back slicer 530 applies interprocedural backward slicing. Based on define-use chains in the source code, the back slicer 530 recovers all possible flows that lead to the invocation statement, track down variable definitions, and assemble strings and variables. If the value of a variable cannot be determined until run-time (e.g., the value of the placeholder string variable {searchHashtag} in FIGS. 2-3), the back slicer 530 uses a placeholder string variable having a symbolic value. For strings with symbolic values, the back slicer 530 performs common string operators (e.g., concatenations and encodeURI). For constant strings with literal values, the back slicer 530 performs additional string operators such as substring, replace, and indexOf.

For some embodiments, it is assumed that all execution paths leading to the web API invocation are feasible so that the back slicer 530 performs path-insensitive data flow analysis. It is possible that a variable has multiple definitions from different define-use chains such that multiple URLs can be extracted from one request as multiple web API usage strings. For example, a variable in the source code can have different values depending on the predicate. Also, a function can be invoked with different parameter values (such as the function changeDisplayStuffs of FIG. 4). For such cases, the back slicer 530 takes the union of all possible values. The back slicer 530 output the analysis result as request information 590 of the identified web API invocations. (FIG. 2 illustrates the example extracted request information 210 in JSON format). For each identified web API invocation, the extractor 155 outputs a set of request information for that identified web API invocation. The extracted request information includes the assembled usage strings, HTTP method, as well as all other properties passed to the $.ajax function as payload appended to the usage strings.

Figure 6:
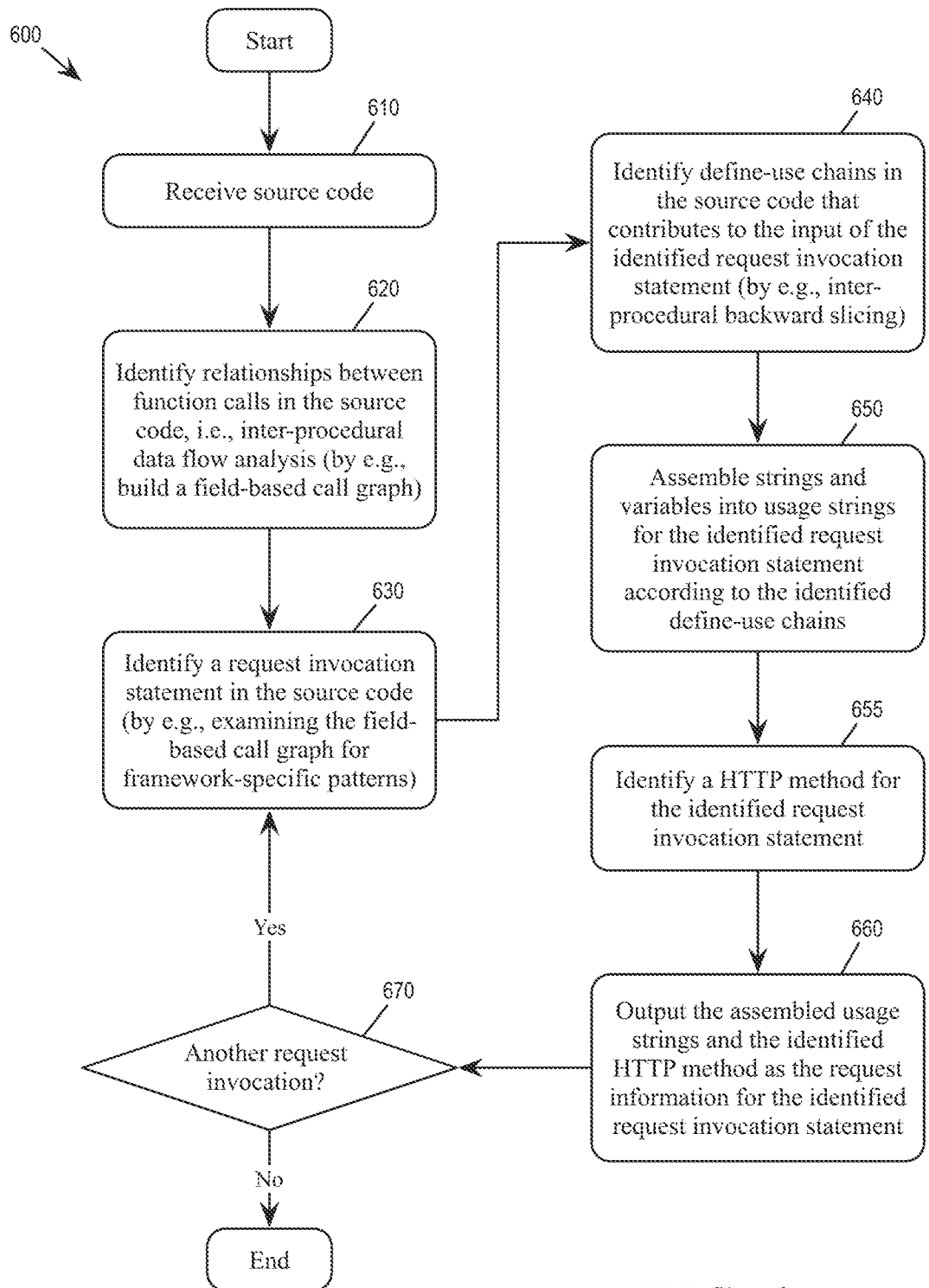
FIG. 6 conceptually illustrates a process for extracting web service request information from source code.

FIG. 6 conceptually illustrates a process 600 for extracting web service request information from source code. In some embodiments, one or more processing units of a computing device implementing the debugging tool perform the process 600. In some embodiments, the one or more processing units performing the process 600 do so by executing software that perform the extraction pipeline of FIG. 5.

The process 600 starts when the debugging tool receives (at 610) source code (e.g., a JavaScript file). The source code includes one or more web API invocations for requesting web-based services. The process then identifies (at 620) relationships between function calls in the source code. This operation corresponds to the inter-procedural data flow analysis performed by the extraction pipeline stage 510 (field-based graph builder), which builds a field-based call graph detailing the data flow relationships between the different functions entities in the source code.

The process identifies (at 630) a web API invocation statement in the source code. This operation corresponds to the pipeline stage 520 (web request locator), which identifies the request invocation by examining the field-based call graph for framework-specific patterns that matches an invocation statement of a web API (e.g., $.ajax).

The process identifies (at 640) define-use chains in the source code that contributes to the input of the identified web API invocation statement. The process then assembles (at 650) resolved literal strings and unresolved placeholder strings into usage strings for the identified invocation statement by tracing the identified define-use chains. This operation corresponds to the pipeline stage 530 (back slicer), which recovers all possible data flows that leads to the identified request invocation statement and assembles usage strings. For variables that can be resolved into constant string values statically before run-time, the process inserts the resolved literal value into the assembled usage string. For variables that can be resolved into multiple different constant values due to multiple define-use chains that lead to the variable, the process produces multiple usage strings. For variables that cannot be resolved statically before runtime, the process inserts a placeholder string variable with symbolic value in the assembled usage string.

The process also identifies (at 655) an HTTP method for the identified invocation statement.

The process outputs (at 660) the assembled usage strings and the identified HTTP method as the request information for the identified invocation statement. The process determines (at 670) whether there is web API invocation statement in the source code. If so, the process returns to 630 to extract request information for the other web API invocation statement. Otherwise, the process 600 ends.

Figure 7:
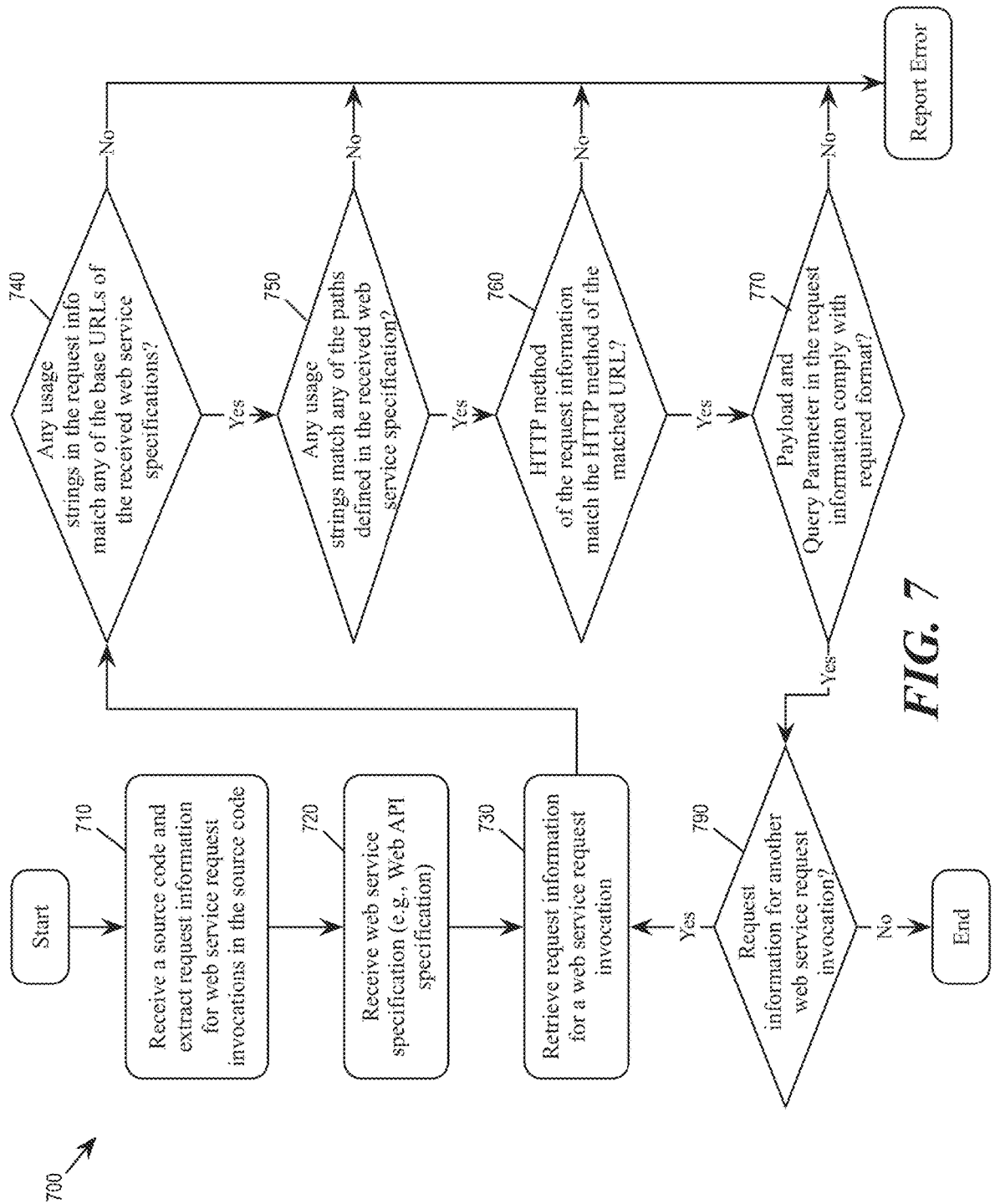
FIG. 7 conceptually illustrates a process for performing static checking of web API invocations in source code.

FIG. 7 conceptually illustrates a process 700 for performing static checking of web API invocations in source code. In some embodiments, one or more processing units of a computing device implementing the debugging tool 100 perform the process 700. The process compares request information extracted from the source code for the web API invocations with corresponding information in web API specifications. The comparison is for revealing inconsistencies between the extracted request information and the specification. The checking procedure compares any possible URL paths assembled from the source code (i.e., usage strings) against the web API specification.

The process 700 starts by receiving (at 710) source code and extracting request information for web API invocations in the source code. In some embodiments, the debugging tool performs this operation by performing the process 600 of FIG. 6.

The process also receives (at 720) a set of web API specifications that specifies how to invoke web APIs. Specifications of the web APIs expose the publicly accessible web services. Such specifications document valid URL paths, HTTP methods, as well as inputs and outputs that a web API expects. The debugging tool may retrieve the web API specifications from over the Internet or from storage that keeps web API specifications.

The process retrieves (at 730) the extracted request information for one of the web service request invocation in the source code (from the operation 710).

The process determines (at 740) whether any of the usage strings in the request information match any of the base URLs of the web API specification. The static web API invocation debugging tool checks whether any of the usage strings in the request information begins with any of the base URLs of the received API specifications. If an API specification includes more than one base URL, all base URLs are checked. It is also possible that multiple specifications are found to match a request invocation. This can occur because multiple specification versions exist for the same API or because the extractor of request information reports multiple URLs usage strings for the request. If no specification can be matched, the process reports an error regarding the request invocation as possibly having an incorrect base URL. If at least one specification has a matching base URL for any of the usage strings of the request, the process proceeds to 750.

The process determines (at 750) whether any of the usage strings in the request information match any of the paths defined in the API specifications. To match a path, the debugging tool takes every usage string of a web API invocation and compares it against the URL path definitions in every specification previously matched (at operation 740) to that web API invocation. The static web API invocation debugging tool retrieves every path definition of the web API invocation's usage strings by truncating off the base URL and the request data from the usage strings. The remaining path strings are then compared against the URL path definitions in the specifications by checking whether every path component matches. (The path components in a usage strings are separated by '/'). The static web API invocation debugging tool allows path components that are placeholder strings or symbolic values (such as strings that are in wiggly brackets) and treat them as wildcards that matches character string. The debugging tool may also match multiple path definitions from one or more specifications to a single web API invocation, because multiple specifications may have matching paths, and a single web API invocation may have multiple URL usage strings. If none of usage strings of the request has a matching base URL and a matching path, the process report an error regarding the request invocation as possibly having an incorrect base URL and endpoint path. If at least one specification has a path definition with the matching base URL for any of the usage strings in the request information, the process proceeds to 760.

The process determines (at 760) whether the HTTP method of the request information matches the matching API endpoint in the specification. If the static analysis does not report an HTTP method, the method is assumed to be "GET". Any method determined by the static analysis is checked against all methods defined in all matched specifications and all matched paths. If the HTTP method of the request does not match the method of the matching URL endpoint in the specification, the process reports an error regarding the method of the request. If the HTTP method matches, the process proceeds to 770.

The process determines (at 770) if the request data in the request information complies with required format specified in the API specification. Request data is the data sent in the payload body of a web API usage string (typically of POST, PUT, or PATCH requests) and/or the data sent within a query string.

For request data sent in the payload body, the static web API invocation debugging tool performs the checking based on the definition provided by the web API specification. The web API specification can freely define the format for the data that is sent in the payload body of an HTTP request. Swagger specifications allow the expected payload data to be defined, either for certain paths (across all methods) or for specific endpoints (an endpoint level definition overrules a path level definition). Payload data definitions can be specified in place, or by referencing definitions in the central definitions section of the specification. The debugging tool at the operation 770 considers all these ways to define payloads and, if needed, resolves conflicts of definitions on different levels. If any of the matched specifications defines a payload schema in any of the matched endpoints, the process determines whether or not the payload data reported in the request information adheres to that schema. A possible violation is that a property marked as required in the schema is not present in the data.

For request data sent with a query string, the debugging tool checks the query string as encoded in key-value pairs. Within API specifications, query parameters can be defined as either optional or required. The process 700 determines whether all required query parameters are present in a request. The static web API invocation debugging tool considers definitions of query parameters from different locations in a specification and resolves possible conflicts between definitions on different levels. To check the query parameters, the process 700 parses the query strings of all URLs reported for a web API invocation. It then checks whether any of the found parameter sets matches the parameter definitions found in any of the endpoint definitions matched for the API invocation.

If the request data does exist as data sent in a payload body or as data in a query string but fails to comply with the requirement set forth in the web API specification, the process reports an error regarding the request data. If the request data correctly comply with the requirement set forth in the web API specification or if the request data does not exist, the process does not report an error and proceeds to 790.

The process determines (at 790) whether there is another web API invocation in the source code for which the process has extracted request information. If so, the process returns to 730 to start checking the request information of the other request invocation. Otherwise the process 700 ends.

It is noted that, provided that the result is substantially the same, the steps of the processes are not required to be executed in the exact order shown in FIGS. 6 and 7.

Figure 8:
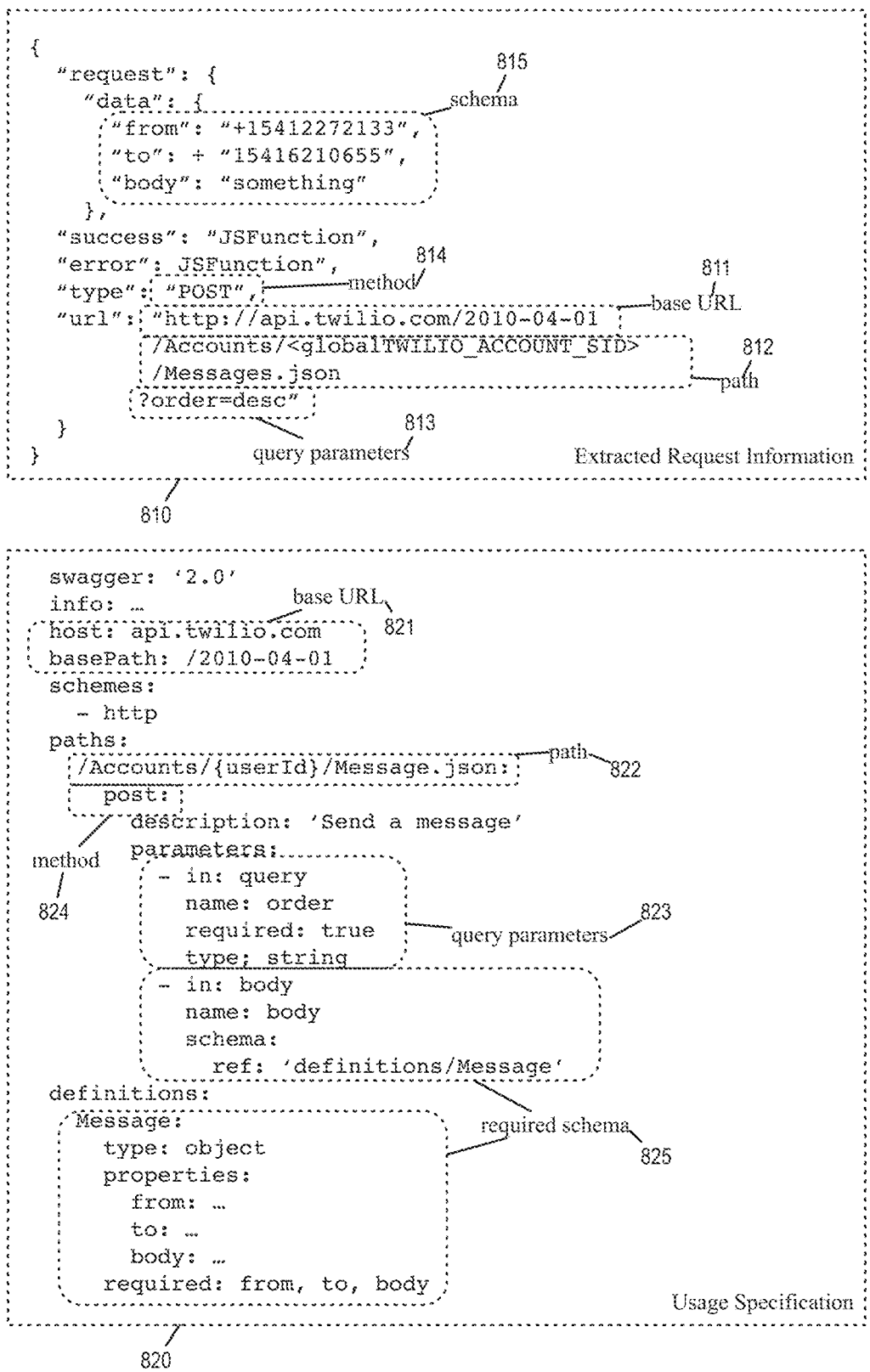
FIG. 8 illustrates various components of request information and their corresponding components in a web API specification.

FIG. 8 illustrates various components of request information and their corresponding components in a web API specification. The figure illustrates an exemplary request information 810 extracted from source code for web service request invocation. The figure also illustrates an exemplary web API specification 820 that includes information used for checking the request information 810. As illustrated, the request information 810 includes components such as base URL 811, URL path 812, query parameters 813, HTTP method 814, and schema 815. The base URL 811, the URL path 812, and the query parameters 813 are concatenated together as one usage string to be checked against the web API specification. When checking the request information 810 and its usage string(s), the debugging tool checks these components with their counter parts in the specification 820, including base URL 821, URL path 822, query parameters 823, HTTP method 824, and required schema 825.

In some embodiments, a static debugging tool for checking source code that generates usage strings for accessing external services is provided. An external service is a service that is provided by an entity outside of the source code (e.g., another website, another program, another device, etc.) or a service that is not defined by the source code. The static web API invocation debugging tool described by reference to FIGS. 1-8 above is one embodiment of a static usage string debugging tool. A static usage strings debugging tool checks a program that generates usage strings for using external services by statically examining the program's source code. The static usage string debugging tool checks the source code by assembling possible usage strings according to the data flow structure of the source code and determining whether any of the assembled possible strings is a permissible string for accessing an external service. When checking a program that invokes web APIs for accessing web-based services, a static usage strings debugging tool (such as the static web API invocation debugging tool 100) extracts the request information for each web API invocation by following the data flow structure of the JavaScript source code to assemble possible usage strings. The tool then checks the assembled possible usage strings to see whether any of them is a permissible string by examining the web API specification, which specifies the requirement of permissible strings for various URL endpoints.

Figure 9:
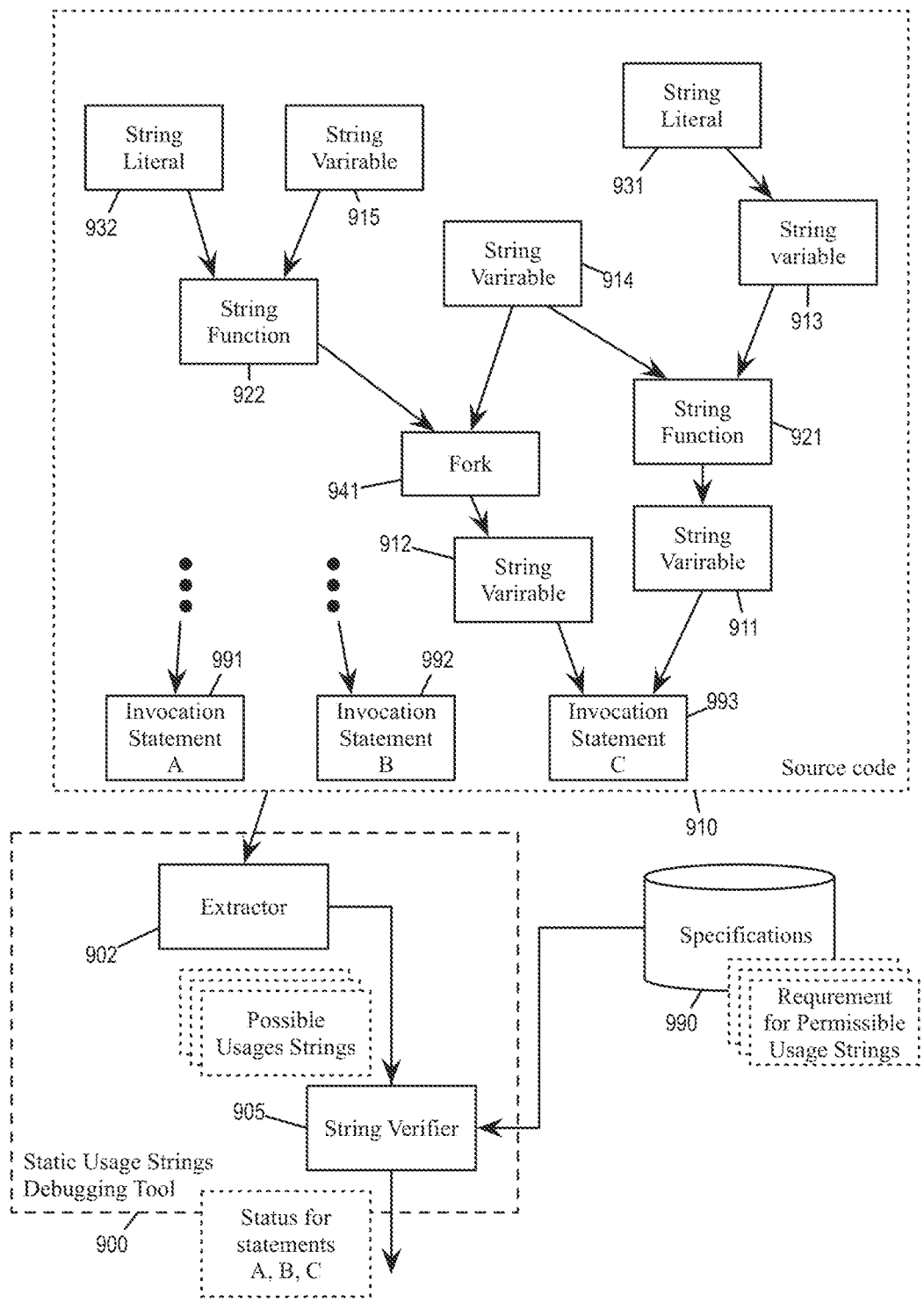
FIG. 9 illustrates a static usage strings debugging tool according to some embodiments of the disclosure.

FIG. 9 illustrates a static usage strings debugging tool 900 according to some embodiments of the disclosure. The tool 900 receives source code 910 of a program that generates usage strings for accessing external services. The tool statically checks the source code to see if the usage strings that the source code may possibly generate are permissible according to a set of specifications 990 for accessing the external services.

As illustrated, the static usage strings debugging tool 900 includes an extractor 902 and a string verifier 905. The extractor 902 is for identifying statements that invoke the external services and for assembling possible usage strings for each of the service invocation statements. The extractor 155 described by reference to FIGS. 1-6 above performs operations similar to those of the extractor 902 in order to extract possible usage strings for web API invocations. The comparator 905 determines whether the extracted possible usage strings comply with the requirements for permissible strings for invoking the external services as set forth by the set of specifications 990. The error checker 170, described by reference to FIGS. 1, 3, and 7, performs operations similar to those of the string verifier 905 when it compares the usage strings in the extracted request information of web API invocations with the requirements for invoking web APIs as set forth in the web API specifications.

The extractor 902 assembles possible usage strings according to the data flow structure of the source code 910. FIG. 9 conceptually illustrates the data flow structure of the example source code 902, specifically data flow structures leading to statements for invoking external services. The source code 902 has three external service invocation statements 991-993. (An example of an invocation statement is $.ajax command of jQuery). The figure illustrates the data flow directed toward the invocation statement 993. For the purpose of illustrative clarity, the data flow for the invocation statements 991 and 992 are not illustrated. Value passing mechanisms such as function calls, assignment statements, define-use relationships are illustrated as arrows.

The data flow directed toward the invocation statement 993 (invocation statement C) is as follows: the invocation statement 993 is formed from two string variables 911 and 912. The string variable 911 is produced by a string function (e.g., concatenate) 921 based on string variables 913 and 914. The string variable 913 is assigned a string literal value 931 within the source code 910. The string variable 912 is assigned to either the string variable 914 or the output of the string function 922 based on a fork mechanism 941. The output of the string function 922 is based on a string variable 915 and a string literal value 932. The extractor assembles the usage strings for the invocation statement 993 tracing back (or back slicing) the define-use chains of the data flow that lead to the invocation statement 993.

The invocation statement 993 has multiple possible usage strings because of the fork mechanism 941 in the source code. The fork mechanism allows the string variable 912 to take on different values under different circumstances and/or conditions. For example, the assignment of the string variable 912 may be inside a function that is called multiple times, say once with the output of the string function 922 as argument and once with the string variable 914 as argument (such as the example illustrated in FIG. 4). A conditional statement that is predicated on an unknown value (i.e., a value that is not statically assigned within the source code) may also control the assignment of the string variable. Since the extractor 902 does not know which value the string variable 912 takes before run-time, the extractor assembles multiple different possible usage strings by traversing all possibilities presented by the fork mechanism 941.

In some embodiments, the static usage strings debugging tool inserts symbolic placeholder strings in possible usage strings to represent string variables that cannot be resolved before run-time. When checking a possible usage string against the specification, each inserted symbolic placeholder string is treated as a wildcard, i.e., the placeholder string may match any string provided that the rest of the usage string complies with the requirement of a permissible string.

Several of the string variables in the source code do not have a statically determinable value: the string variable 914 and 915. These unresolved string variables are not assigned literal values (e.g., string literals 931 and 932 by the source code, but rather have to wait until run-time to have actual literal values. The extractor 902, in turn, assembles the usage strings for invocation statement 993 by representing these unresolved variables as placeholder strings with symbolic values (e.g., the placeholder string 216 with symbolic value {searchHashtag}).

Example Electronic System:

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
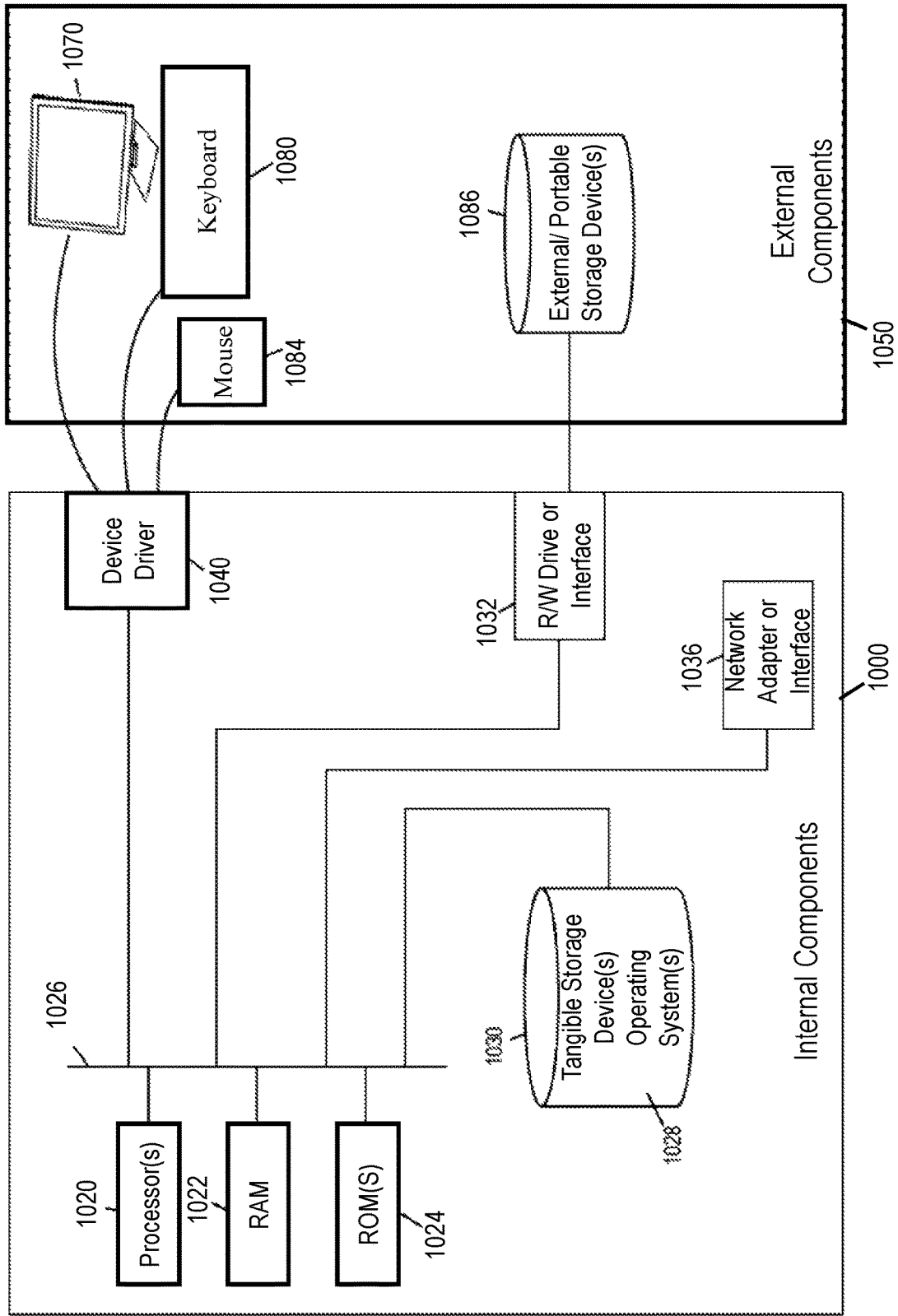
FIG. 10 shows a block diagram of the components of a data processing system in accordance with an illustrative embodiment of the present disclosure.

FIG. 10 shows a block diagram of the components of data processing systems 1000 and 1050 that may be included within a cloud datacenter that provides a static web API invocation debugging tool over the Internet in accordance with an illustrative embodiment. It should be appreciated that FIG. 10 provides only an illustration of one implementation and does not imply any limitations with regard to the environments in which different embodiments may be implemented. Many modifications to the depicted environments may be made based on design and implementation requirements.

Data processing systems 1000 and 1050 are representative of any electronic device capable of executing machine-readable program instructions. Data processing systems 1000 and 1050 may be representative of a smart phone, a computer system, PDA, or other electronic devices. Examples of computing systems, environments, and/or configurations that may represented by data processing systems 1000 and 1050 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 1000 and 1050 may include a set of internal components 1000 and a set of external components 1050 illustrated in FIG. 10. The set of internal components 1000 includes one or more processors 1020, one or more computer-readable RAMs 1022 and one or more computer-readable ROMs 1024 on one or more buses 1026, and one or more operating systems 1028 and one or more computer-readable tangible storage devices 1030. The one or more operating systems 1028 and programs such as the programs for executing the processes 600 and 700 are stored on one or more computer-readable tangible storage devices 1030 for execution by one or more processors 1020 via one or more RAMs 1022 (which typically include cache memory). In the embodiment illustrated in FIG. 10, each of the computer-readable tangible storage devices 1030 may be a magnetic disk storage device of an internal hard drive. Alternatively, each of the computer-readable tangible storage devices 1030 is a semiconductor storage device such as ROM 1024, EPROM, flash memory or any other computer-readable tangible storage device that can store a computer program and digital information.

The set of internal components 1000 also includes a R/W drive or interface 1032 to read from and write to one or more portable computer-readable tangible storage devices 1086 such as a CD-ROM, DVD, memory stick, magnetic tape, magnetic disk, optical disk or semiconductor storage device. The instructions for executing the processes 600 and 700 can be stored on one or more of the respective portable computer-readable tangible storage devices 1086, read via the respective R/W drive or interface 1032 and loaded into the respective hard drive 1030.

The set of internal components 1000 may also include network adapters (or switch port cards) or interfaces 1036 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 1036. From the network adapters (or switch port adaptors) or interfaces 1036, the instructions and data of the described programs or processes are loaded into the respective hard drive 1030. The network may comprise copper wires, optical fibers, wireless transmission, routers, firewalls, switches, gateway computers and/or edge servers.

The set of external components 1050 can include a computer display monitor 1070, a keyboard 1080, and a computer mouse 1084. The set of external components 1050 can also include touch screens, virtual keyboards, touch pads, pointing devices, and other human interface devices. The set of internal components 1000 also includes device drivers 1040 to interface to computer display monitor 1070, keyboard 1080 and computer mouse 1084. The device drivers 1040, R/W drive or interface 1032 and network adapter or interface 1036 comprise hardware and software (stored in storage device 1030 and/or ROM 1024).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Example Characteristics:

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Example Service Models:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 11:
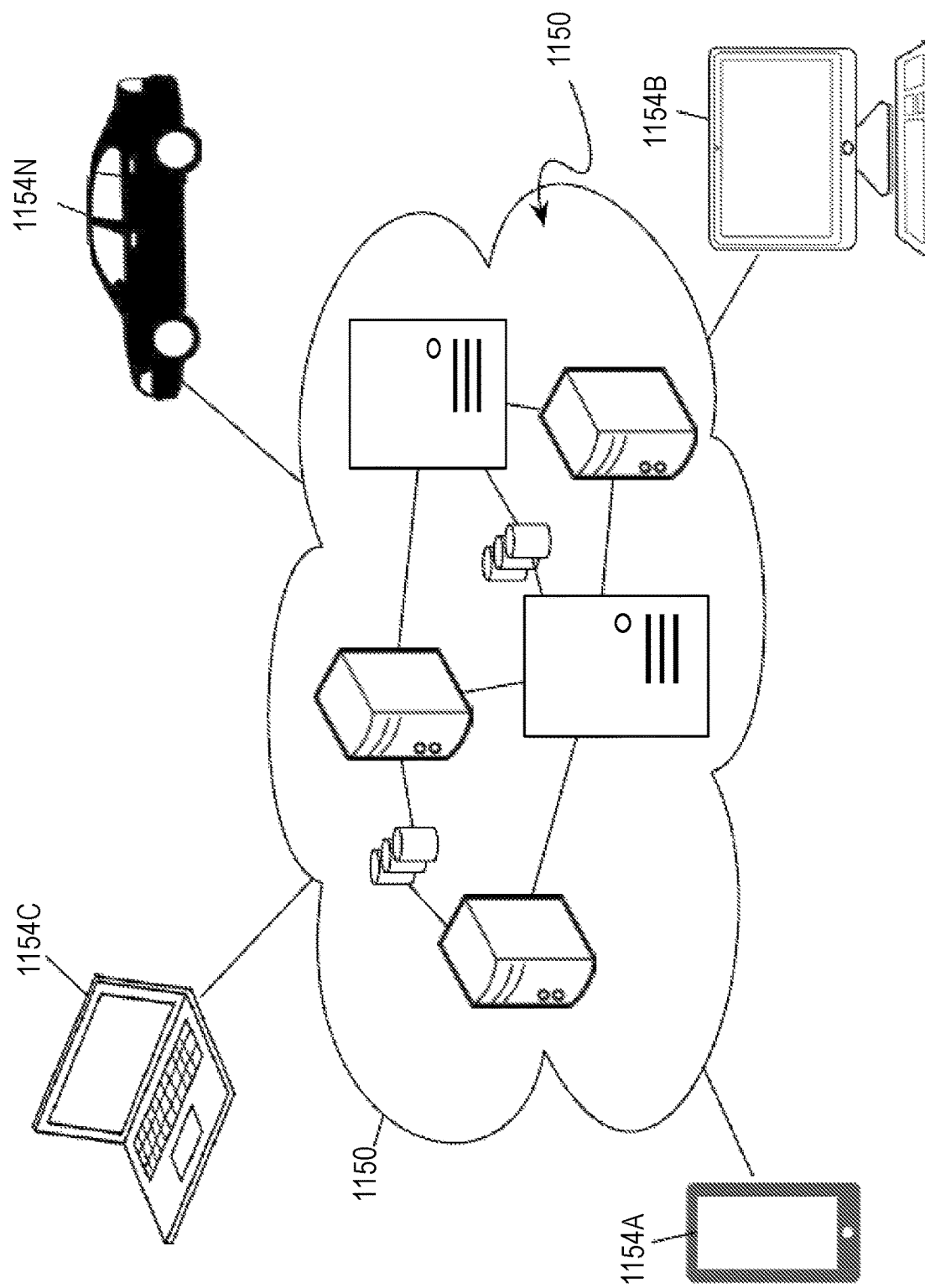
FIG. 11 illustrates a cloud-computing environment.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
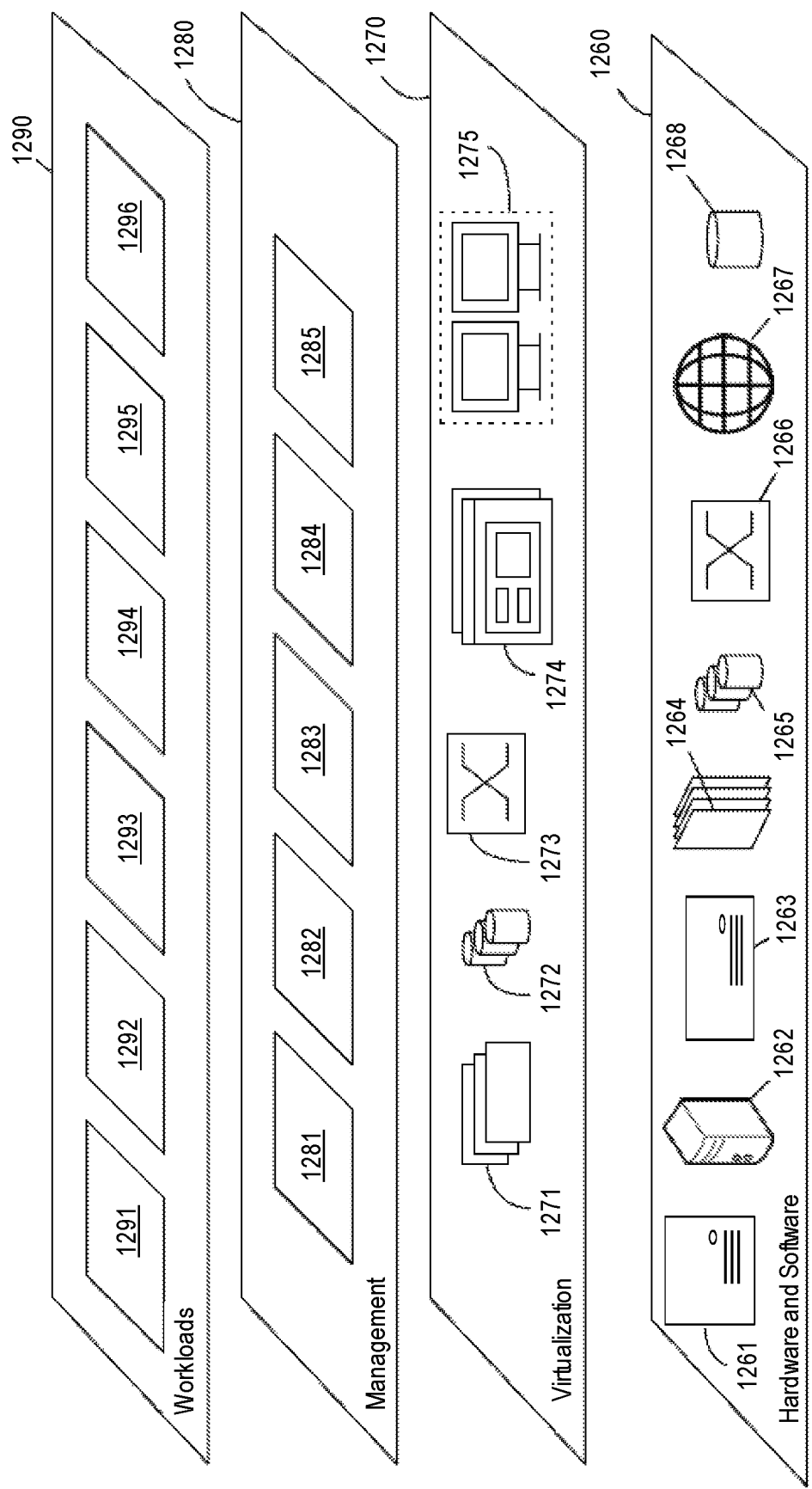
FIG. 12 illustrates a set of functional abstraction layers provided by a cloud-computing environment.

Referring now to FIG. 12, a set of functional abstraction layers provided by cloud computing environment 1150 (of FIG. 11) is shown. It should be understood that the components, layers, and functions shown in FIG. 12 are intended to be illustrative only and embodiments of the disclosure are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud-computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and static web API invocation debugging tool 1296. In some embodiments, the workload 1296 for static web API invocation debugging tool performs the functions of the extractor 155 and the error checker 170.

The foregoing one or more embodiments implements a static debugging tool for programs that invoke web APIs within a computer infrastructure by having one or more computing devices performing analysis of source code.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of statically verifying source code to prevent a run-time error, the method comprising:
   executing, by a computing device, a web API invocation debugging tool;
   identifying, by the web API invocation debugging tool, an invocation statement in the source code for using a service that is provided by an entity outside of the source code;

identifying, by the web API invocation debugging tool, data flow of string variables in the source code that lead to the identified invocation statement;

assembling, by the web API invocation debugging tool, one or more usage strings for the invocation statement based on the identified data flow of string variables;

assigning, by the web API invocation debugging tool, a placeholder string to represent a string variable in the identified data flow that is not assigned a literal value by the source code before run time and cannot be resolved statically;

constructing, by the web API invocation debugging tool, an endpoint specification string based on a specification that describes permissible strings;

checking, by the web API invocation debugging tool, each assembled usage string based on the constructed endpoint specification string by way of a comparison of each assembled usage string having the assigned placeholder string with the constructed endpoint specification string thereby statically verifying the source code; and preventing the run-time error by reporting a result of the verification.

2. The method of claim 1, wherein checking each assembled usage string comprises, for each assembled usage string, the computing device treating each placeholder string as a wildcard when comparing the assembled usage string with permissible strings described by the specification.

3. The method of claim 1, wherein the invocation statement is for using a web Application Programming Interface (web API) to invoke a web-based service.

4. The method of claim 1, wherein checking each assembled usage string comprises, for each assembled usage string, determining whether the assembled usage string matches a uniform resource locator (URL) endpoint specified by the specification.

5. The method of claim 4, wherein checking each assembled usage string comprises, for each assembled usage string:
   determining whether the assembled usage string comprises request data for the URL endpoint; and
   determining whether the request data complies with the specification.

6. The method of claim 4, further comprising reporting an error regarding the invocation statement when none of the one or more assembled usage strings matches a URL endpoint specified by the specification.

7. A computer implemented method of preventing a run-time error, comprising:
   receiving, by a computing device, source code comprising one or more invocations of web application programming interface (web API) operative to request one or more web-based services;
   receiving, by the computing device, a set of web API specifications;
   extracting, by the computing device, a set of request information for each web API invocation in the source code, the set of request information comprising a usage string of a uniform resource locator (URL) endpoint;
   constructing, by the computing device, a specification string of the URL endpoint;
   verifying, by the computing device, whether the set of request information complies with the received web API specifications based on the constructed specification string by way of a comparison of the usage string having at least one placeholder string and the constructed specification string thereby statically verifying the source code; and
   preventing the run-time error by reporting a result of the verification,
   wherein extracting the set of request information of a web API invocation comprises assembling the usage string by following a data flow of string variables leading to the web API invocation, and
   wherein the assembled usage string comprises the at least one placeholder string that is used to represent a string variable in the data flow of string variables that cannot be resolved statically.

8. The method of claim 7, wherein the set of request information further comprises a hypertext transfer protocol (HTTP) method.

9. The method of claim 7:
   wherein the usage string further comprises request data, and
   wherein the verifying the set of request information comprises checking the request data for compliance with a requirement set forth in the received web API specifications.

10. The method of claim 7, wherein verifying whether the set of request information complies with the received web API specifications comprises the computing device treating the placeholder string as a wildcard for matching any string.

11. The method of claim 7, wherein extracting the set of request information of the web API invocation comprises assembling a plurality of usage strings by following the data flow of string variables leading to the web API invocation.

12. The method of claim 11, wherein verifying whether the set of request information complies with the received web API specifications comprises determining whether at least one of the plurality of assembled usage strings complies with the received web API specifications.

13. A computing device comprising:
   a set of one or more processing units;
   a storage device storing a set of instructions, wherein an execution of the set of instructions by the set of processing units configures the computing device to perform acts comprising:
   identifying an invocation statement in source code for using a service that is provided by an entity outside of the source code;
   identifying a data flow of string variables in the source code that leads to the identified invocation statement;
   assembling one or more usage strings for the invocation statement based on the identified data flow of string variables;
   constructing an endpoint specification string based on a specification that describes permissible strings; and
   checking each assembled usage string based on the constructed endpoint specification string by way of a comparison of each assembled usage string having a placeholder string with the constructed endpoint specification string thereby statically verifying the source code; and
   preventing a run-time error by reporting a result of the verification, wherein at least one assembled usage string comprises the placeholder string to represent a string variable in the identified data flow that is not assigned a literal value by the source code before run-time and cannot be resolved statically.

14. The computing device of claim 13, wherein checking each assembled usage string with permissible strings described by the specification is based on treating each placeholder string as a wildcard operative to match any string.

15. A computing device comprising:
a set of one or more processing units;
a storage device storing a set of instructions, wherein an execution of the set of instructions by the set of processing units configures the computing device to perform acts comprising:
receiving source code comprising one or more invocation of web application programming interface (web API) for requesting web-based services;
receiving a set of web API specifications;
extracting a set of request information for each web API invocation in the source code, the set of request information comprising a usage string of a uniform resource locator (URL) endpoint;
constructing a specification string of the URL endpoint;
verifying whether the set of request information complies with the received web API specifications based on the constructed specification string by way of a comparison of the usage string having at least one placeholder string with the constructed specification string thereby statically verifying the source code; and
preventing a run-time error by reporting a result of the verification,
wherein the set of instructions for extracting the set of request information of a web API invocation comprises a set of instructions for assembling the usage string by following a data flow of string variables leading to the web API invocation, and
wherein the assembled usage string comprises the at least one placeholder string that is used to represent an unresolved string variable in the data flow of string variables that cannot be resolved statically.

16. The computing device of claim 15:
wherein the set of request information further comprises a hypertext transfer protocol (HTTP) method;
wherein the usage string further comprises request data;
wherein verifying the set of request information comprises checking the request data and the HTTP method for compliance with a requirement set forth in the received web API specifications.

17. The computing device of claim 15, wherein the set of instructions for verifying whether the set of request information complies with the received web API specifications treats the placeholder string as a wildcard for matching any string.

18. The computing device of claim 15, wherein the set of instructions for extracting the set of request information of the web API invocation comprises a set of instructions for assembling a plurality of usage strings by following a data flow of string variables leading to the web API invocation.

* * * * *